INVENTOR.
ROBERT B. DICKSON
ATT'Y.

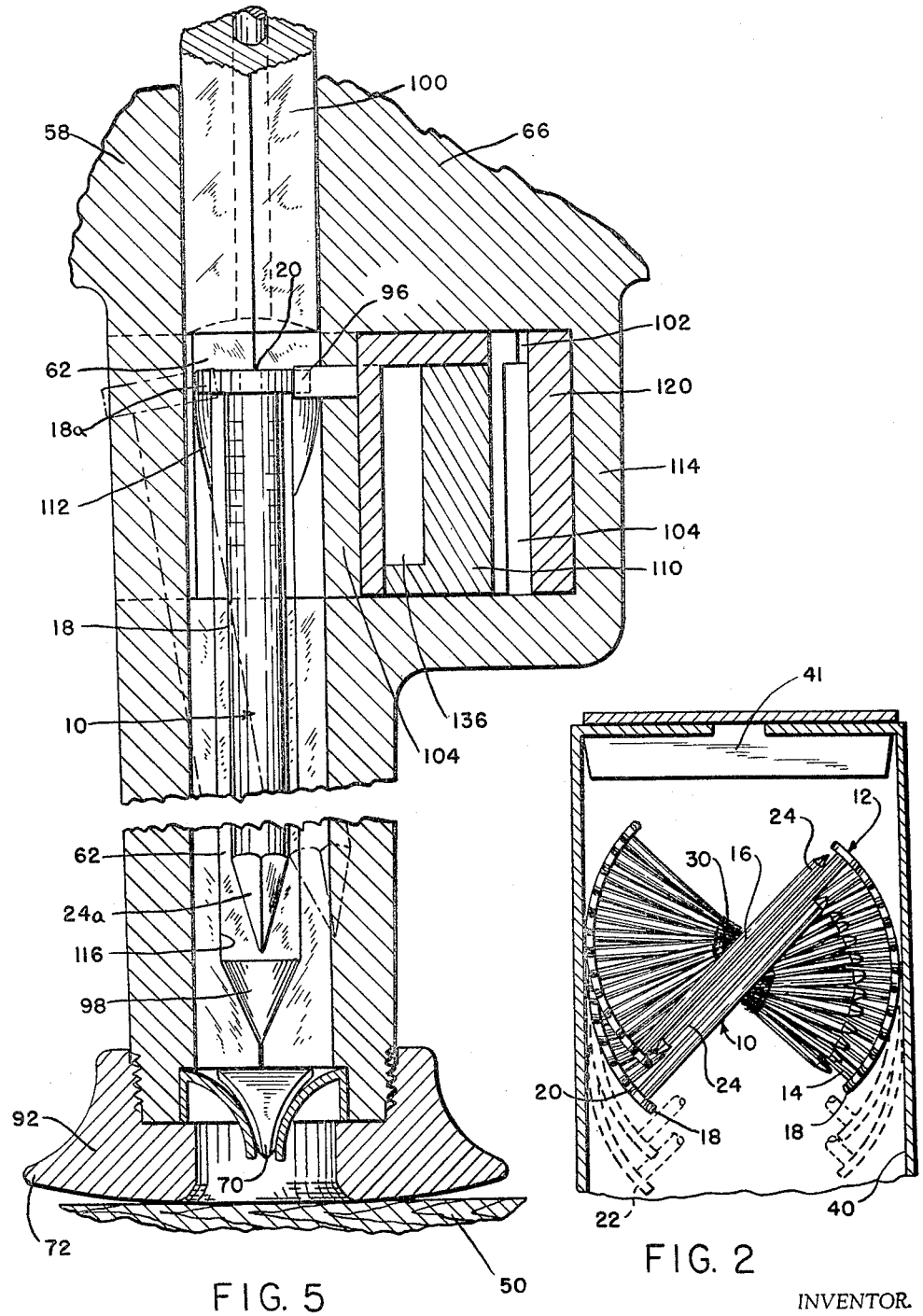

Aug. 16, 1966 R. B. DICKSON 3,266,698
MAGAZINE FOR NAILER
Original Filed Nov. 5, 1963 3 Sheets-Sheet 3
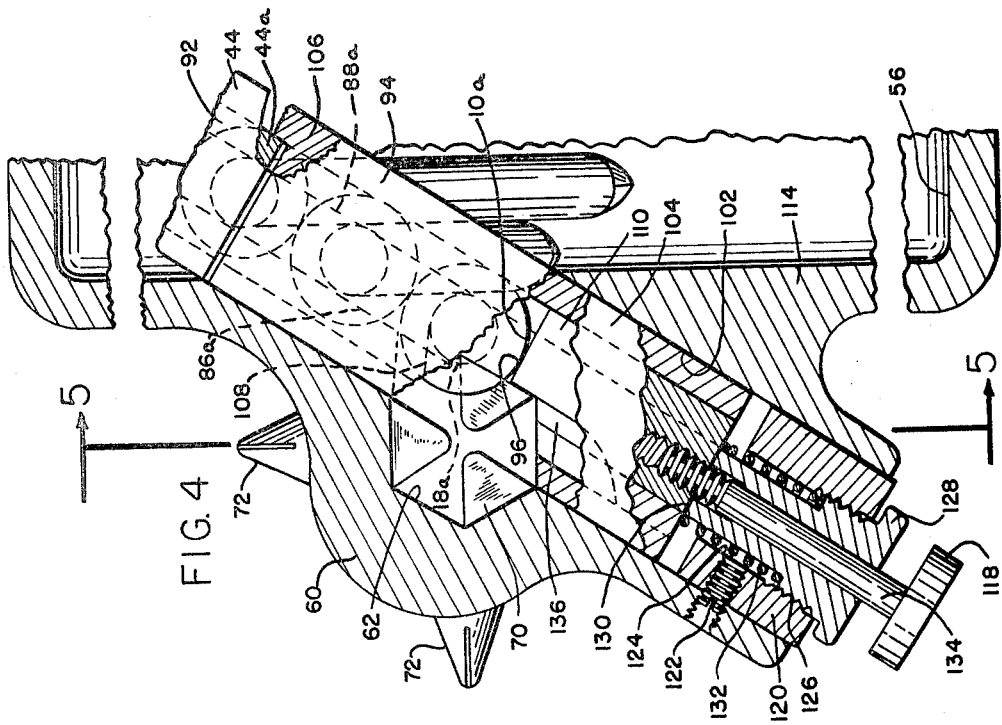
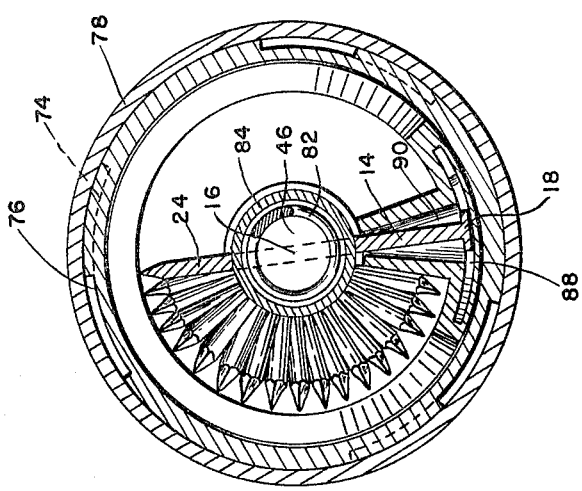
INVENTOR.
ROBERT B. DICKSON
BY
ATT'Y.

United States Patent Office 3,266,698
Patented August 16, 1966

3,266,698
MAGAZINE FOR NAILER
Robert B. Dickson, Evanston, Ill., assignor to Dickson Weatherproof Nail Company, Evanston, Ill., a corporation of Delaware
Original application Nov. 5, 1963, Ser. No. 321,450, now Patent No. 3,212,633, dated Oct. 19, 1965. Divided and this application May 28, 1965, Ser. No. 459,559
9 Claims. (Cl. 227—120)

The present invention is a division of application Serial No. 321,450, filed November 5, 1963 issued as U.S. Patent No. 3,212,633, dated October 19, 1965 and relates to power driven nailing equipment in which nails, particularly common nails, both loose and in clips are fed to an automatic hammer.

Power equipped devices have been used for many years for driving nails and brads. Many problems have beset the industry requiring the provision of special nails and magazines inclined to the driving barrel. Expensive strips, wire, webbing or adhesive tapes have been resorted to in order to space the nail shanks and maintain the nail heads in coplanar relationship for straight line feed applications.

An object of the invention resides in handling common nails having single, double or cabinet heads in clips of ten nails which are compactly shipped and easily managed for a gun taking up to fifty nails to one loading, yet the gun can be quickly loaded fully or in part with any common or headed nail one at a time if desired or necessary.

A further object of the invention is to provide a simple, power driven nailer of the repeating type embodying a novel magazine which is easily loaded with clips of nails or independent nails individually or in groups, with the magazine either readily replaceable, or quickly rechargeable without removal.

A further object of the invention is to provide a resting status for a power nailer which prevents movement of the next nail from the magazine into the driving chamber until after actuation of the device whereupon release is immediately accomplished followed instantly by the first of a series of nail driving hammer blows with continuous contact being maintained between the nail and the driving element struck by the hammer.

Another object resides in providing a magazine construction which handles all common nails as well as many special nails in a lineal space no longer than the sum total of the nail shank diameters loaded in the magazine.

A further object of the invention resides in maintaining the shank portions of common nails in contact with one another in a magazine whereby nail feed movement to a driving element may be accomplished by forces applied remotely from the driving element as at the entry end of the magazine.

Further objects of the invention will appear from the description which follows and the drawings related thereto in which:

FIG. 2 is a top plan view partly in section of the nail clip form embodying the invention as packaged with the clips in nested relationship.

FIG. 3 is a section taken on line 3—3 of FIG. 1.

FIG. 4 is a cross sectional view taken through the bore and feed chamber of the nail driving elements and approximately the level of the nail heads entering the bore for driving purposes.

FIG. 5 is a section taken upon line 5—5 in FIG. 4.

Figure 6:
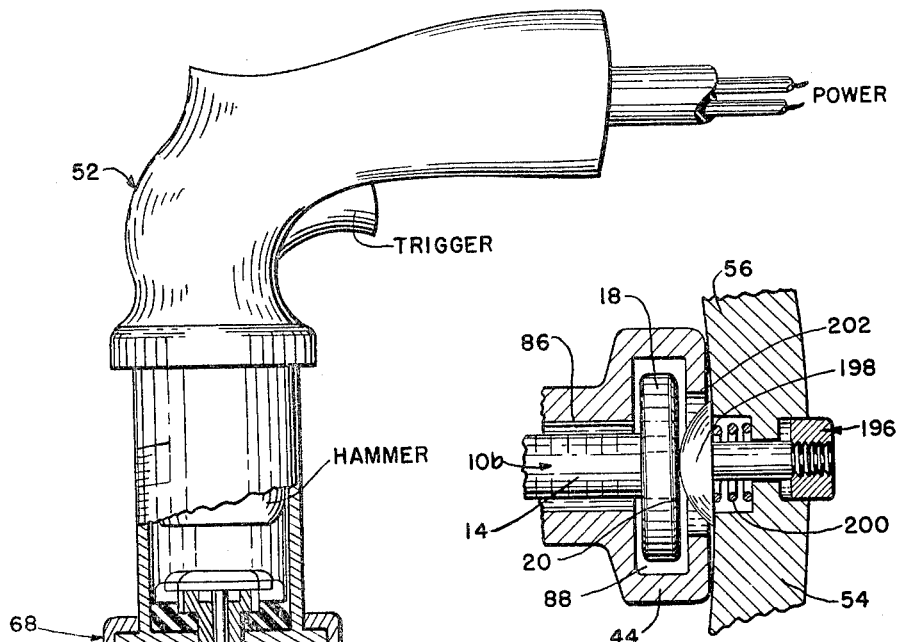
FIG. 6 is a section taken through a portion of the magazine wall showing the construction of a nail supply depletion indicator.

The invention is illustrated in connection with nails that are most used. Such is the common nail that ranges from 1.5 to 2.5 inches in length and the nail 10 particularly disclosed is an eightpenny common nail approximately 2.5 inches long with a wire shank diameter of .13 inch and head diameter of .28 inch. For ready handling the nails are arranged in clips 12 of ten nails each (FIG. 2) in which the shanks 14 contact a little off-center their midpoint in a straight line 16 sometimes referred to herein as an axis and the heads 18 contact edge-to-edge at their periphery in a helical path with their top surfaces 20 defining a cylindrical surface of revolution 22.

Although both contacting areas may be adhered with a frangible cement 30 (FIG. 3), it has been found that adherence at the center contacts of the nail shanks is adequate.

The helix angle is one of approximately 35° and although the clips may be formed to a full helical turn or any part of a full turn, it is preferred to furnish them in units of ten nails each. This provides a little less than a 90° turn as shown in FIG. 2. The heads are about twice the diameter of the shank. In this size and number they are easy to count, assemble, handle and package. The clips nest with each other and pack flat side by side with the center lines 16 spaced and parallel with each other (FIG. 2). Shorter nails down to 1.5 inch in length can be formed on the same helix but the shanks would contact nearer the point ends 24 of the nail, the heads 18 remaining the same helical path.

When received ready for use, the flap 41 of the package 40 is opened at the end and the nested clips are slid therefrom to be dropped one by one into a helical nail feeder magazine 42 (FIG. 1) having a helical feeder track 44 in which the nails are advanced by a follower 46 at the entry end to a terminal magazine feed station indicated at 48 where the nails are severed one at a time and driven into a workpiece 50. With factory nailing machines the clips can be fed automatically. The package can be end opened and the clips dropped straight away one by one into a passageway in which the clips are oriented all ends alike for entrance into a helical feed magazine as a continuous helix of nails. The passageway catches the wider overall axial height of the clip at the head portion and turns each alternate clip into oriented position.

Figure 1:
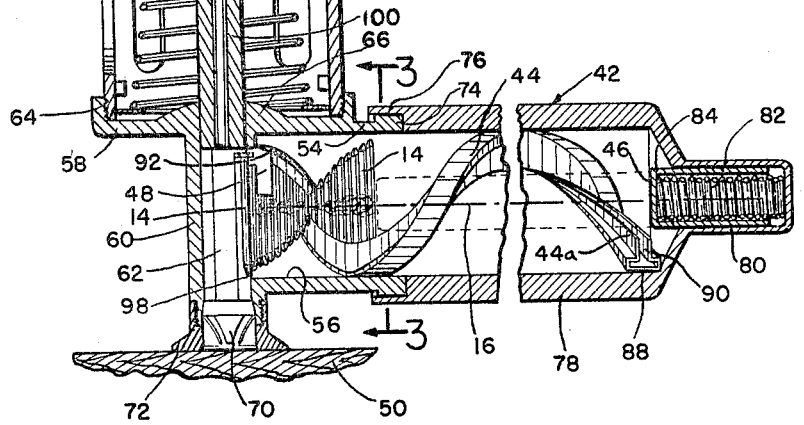
FIG. 1 is a side elevational view partly in section taken longitudinally and centrally through a portable power nailer embodying the invention.

With portable power tools such as shown at 52 in FIG. 1, the clips can be hand inserted one or more at a time into the track 44 in magazine 42. The magazine will take at least four clips, preferably six to eight. Four clips will supply a magazine of 40 nails and a six to seven inch magazine provides a starting charge of half a hundred nails plus any partially used clip already present. Moreover, it will be appreciated from the description herein that loose common nails can also be fed into the magazine 42 if desired at any time as a group or intermingled between clips.

The magazine 42 includes a tubular housing 54 forming a cylindrical compartment 56 on a power tool housing 58 made of light cast metal having a transverse barrel 60 and bore 62 terminating at the top in an internally threaded flanged 64 cavity 66 which receives a power unit 68 thereon. The barrel 60 terminates at the bottom in a nail guide 70 and nail position indicator bosses 72.

The tubular housing 54 on its outer marginal end is provided with small bosses defining male members 74 of a bayonet joint union in which the mating slots or grooves 76 are provided in the flange portion of a closure 78 having a cavity 80 which supports a spring 82 moving a follower 84 coaxially to the tubular housing.

The helically shaped track 44 is peripherally supported in the tubular housing to receive nail clips 14 in helically aligned and guiding relationship. The plan contour of the nail 10 adjacent to and including the head 18 (FIG. 6) is approximated in the cross-sectional contour of the track and preferably is defined by an elongated element having a T-groove 86 therein, the element preferably is rolled from straight stock like a helical spring into a helix in which the head portion 88 of the groove defines a helical lead angle of approximately 35° and the space between the legs 90 of the T-groove define a helix angle, of 45° or more, leaving approximately one-third to one-half of the length of the nail shank 14 exposed at the center of the tubular housing 54. If a 2.5 inch nail is fed, a center third portion of the shank will be exposed. If a 1.5 inch nail is fed, it will be the terminal portion of the shank that is exposed. If the nail heads 18 are twice the diameter or more of the shank 14, the head helix angle will be 35° or less accordingly. If the heads 18 are less than twice the diameter of the shank 14, a magazine and helix of 35° will still take the nails with the clip provided with a 35° helix angle.

The track can be formed in a continuous process with radially directed pairs of turning rollers and axially directed twisting rollers operating against a radially directed flange roller canted to the helix angle of the mouth of the track.

Although the track 44 can serve as an interchangeable assembly clip component, it preferably is secured to the inner wall 56 of the tubular member 54 and the outer mouth of the track 44 is shaped to only receive the heads of the nail clip. The feed follower 46 slides in and is guided on the inner edges of the track where the helix angle is 45° or more, thereby providing a favorable angle for advancing the nails with pressure at the clip axis 16. Other bracing elements (not shown) may be provided as needed to rigidify the assembly.

Thus, even if loose nails are employed, the nails are held in crossed relation at the axis 16 of the compartment 56 as guided by the side walls of the track and the angle of the helix which permits the nail heads to clear themselves in a spiral direction without any endwise movement of individual nails. Finishing nails in clip form can also be used because the adhesive as well as the fanned-out relationship of the head portions hold the nails in proper orientation.

Whenever it is desired to load the magazine the closure 78 is twisted free and removed preferably leaving the guideway supported in the compartment defined by the inner wall 56. The spring 82 relaxes and the follower 46 is withdrawn from its guideway. Additional nail clips are then loaded in the track 44 and the closure is returned. The spring 82 is again compressed in the internal guide after the follower contacts the last nail and thereby provides a nail propelling feed action where the nails solidly cross each other at the axis of the tubular housing. The helical guide is terminally located by suitable means such as end stops and guide ears or pins which hold the inner end 92 of the track 44 in coincidence with a feed arrangement as will now be described.

At the inner end 92 of the track 44 the endmost nails 10a pass successively one at a time from the track into a guide block 94 (FIG. 4) and into terminal engagement with a vertical shoulder 96 that aligns the shank of the nail with the bore 62 in the barrel 60. The endmost nail in this position has the lower or point end disposed where it enters or is cammed as at 98 (FIG. 5) into the bore 62. The head 18 of the nail protrudes into the bore 62 and when the drive piston 100 is forced from its position downwardly in the bore 62 the nail head is engaged and displaced. The nail 10 is thereby broken free of its cement and stop restraints and is carried radially inwardly and downwardly in the bore. The point 24 strikes and starts itself in the work 50 after which repeated blows upon the piston 100 forces the nail deeper and deeper without contact between the piston and nail head being relinquished until the nail has been driven to the depth desired.

More particularly, in FIG. 4 it will be observed that the bore 62 is hexagonal and the barrel 60 is broached at a tangent to the bore to provide a rectangular opening 102 therethrough as wide as the widest width of the T-shaped track 44. A block 104 is then made with a corresponding T-groove 88a therein abutting the track end 92 in alignment therewith as guided by two ears 106 which telescope over the sides of the leg portion 44a of the track 44 just below the head portion thereof. The block may be made of two elements fused or riveted together to provide tangential intersection of the bore 62 with a T-slot 86a having a lateral discharge opening at 108 disposed radially to the bore 62.

A T-shaped stop member 110 is slidably received in the block 104 beyond the opening 108 and has a squared end which carries the stop 96 slidably in the T-groove 88a to limit movement of the nail head 18a. Assuming the axis of the endmost nail as so limited, the block 104 is shaped by a side cutting tool (not shown) below the head 18a to provide a coaxial conical cam 112 (FIG. 5) which shifts the head 18a fully into the bore 62 as it is moved downwardly by the piston, first to clear the squared end stop 96 and then downwardly across the cam surface 112.

Below the block, the wall 114 of the housing is milled out to provide a full access opening 116 for the endmost nail to come into parallel relationship with the bore and a like coaxial cam or chamber 98, as already mentioned, is provided at the bottom thereof to assure movement of the lower end of the nail fully into the bore 62 when the nail head is moved downwardly initially by the piston 100.

For the occasions when it may be desirable to actuate the piston 100 without injecting a nail 10a into the bore, the slide member 110 (FIG. 4) may be pushed by a button 118 to move the squared stop 96 and force back the endmost nail 10a from its "ready" position intruding in the bore 62. For this purpose the outer end of the rectangular opening is plugged with a block 120 held in place by a set screw 122, is bored at 124 and internally threaded at 126 to receive an adjustable sleeve 128. The sleeve 128 has a stop 130 thereon for the slide block 104 and a spring guide for a compression spring 132 that urges the slide block towards the oncoming nails when the endmost nail 10a has been discharged from the delivery portal 86a. A push rod 134 threaded to the slide block 104 carries the button 118 on the end thereof and thereby further serves as a telltale as to whether or not a nail 10a is in delivery position. The slide block is milled out along the contour 136 to clear the drive piston 100 regardless of the position of the slide block 104.

It will be observed that while a nail 10a is being driven, the piston 100 wall holds back the next nail 10 until the piston is retracted. During this time the slide block 104 moves towards the incoming nail under the mild influence of the spring 132 and tool vibration and makes contact with the head 18 thereof so that it is somewhat guided and constrained in attaining and remaining in delivery position after the piston is retracted. Adjustment of the sleeve 128 and stop 130 assists in positioning the end nail 10a. In this connection it will also be observed with nails having different head sizes that the tangency of the nail advance is such that a portion of the shank 14 diameter also intrudes into the bore 62, as seen in FIG. 1, thereby assuring by this adjustment that nails having the smallest of heads for a given shank size can be driven.

Furthermore, it is to be noted that merely by changing the block 104 and the track 44 in the magazine 56 any nail smaller can be handled by the device described.

In the event the operator permits the piston 100 to return to a position above the next nail head 18 and he desires to finish driving the previous nail, the slide block 110 and stop 96 are moved as controlled by a button 118 to drive the endmost nail head back out of the path of movement of the piston thereby permitting the piston to be lowered to resume driving the previous nail, or, to permit merely a pounding action without movement of any nails being involved. Release of the button 118 permits resumption of the successive driving of further nails from the magazine.

As the head of the endmost nail 10a is severed from the clip and moved downwardly, it clears the shank of the next nail 10 by the cams described but preferably before the point 24a of the nail contacts the work the downwardly inclined spring fingers 70 center the point.

It is highly desirable that the magazine be kept free from outside contamination and for this reason it is made completely sealed except when loading. For the convenience of the operator, a nail reserve indicator 196 (FIG. 6) can be provided comprising an element glider button 198 lightly spring pressed by spring 200 against the head 18 of the eleventh remaining nail 10b in the magazine through an opening 202 in the head portion of the track 44 at that point. When ten nails remain the slider is no longer supported and moves flush with the housing to indicate ten or less nails remaining in the magazine. This is located one-quarter turn of the track 44 away from the discharge portal 48 on the right hand side of the housing 54.

While common nails are disclosed in the drawing and the description relating thereto it will be understood that any form of nail having a head diameter larger than the shank can be handled by devices embodying the invention, including spikes, roofing nails, brads, finishing nails, etc., and further that frangible bonds other than cement can be employed including plating material, soft wires fused thereon, or tapes, provided they hold the shanks in contact with each other where they cross.

Having thus disclosed and described the invention, it will be readily apparent how the stated objects and other objects and advantages set forth are accomplished and how various and further changes can be made therein without departing from the spirit of the invention, the scope of which is commensurate with the appended claims.

What is claimed is:

1. A nail magazine guide comprising a feed way defined by two spaced sides defining a helical space the outer edges of which define a helix having a lead angle of approximately 35° and the inner edges define a helix having a lead angle of 45° and more, said guide being open through the center thereof, and means spaced from said outer edges defining a cylindrical surface of revolution for holding the nail heads against radial movement in said helical space.

2. A nail magazine comprising a cylindrical shell, a feed way track defined by two spaced sides providing a radially oriented helical space between them the radial outer edges of which define a helix having a lead angle of approximately 35° and the radial inner edges define a helix having a lead angle of approximately 45°, said track being open axially through the center thereof and said inner edges defining a cylindrical surface of revolution, and means integrating the two spaced sides defining a cylindrical surface of revolution for holding nail heads against radial movement in said helical space, said feed way track being received in said cylindrical shell, and resilient means carried by said shell slidable through said center opening in guided relation on the inner edges of said spaced sides to urge nails along said feed way.

3. In a nailer having a housing providing a tubular portion forming a cylindrical compartment and barrel portion having a bore laterally in communication with the compartment, a helical nail feeder track peripherally supported in the tubular portion and having a T-shaped groove therein for receiving the head portion of a series of nails and exposing not less than one-third of the shank of the nails carried therein at the axial center of the compartment, cap means for closing said compartment having a feed follower guided at the inner edges of the track to engage the shank of a nail at the axis of the helical track, and resilient means interconnecting said feed follower and cap for propelling the feed follower toward said bore.

4. In a nailer having a housing providing a tubular portion forming a cylindrical compartment and a barrel portion having a bore and a portal in the wall thereof for receiving laterally therethrough a portion of the head of the leading nail of a series of nails in a direction tangential to the bore, magazine guide means received in said tubular portion supporting said series of nails with their heads successively contacting each other edge to edge in a helical path which has an acute angle as projected radially against its axis with the shanks of the nails crossing each other at contacting points intermediate their ends that are disposed on an axis normal to said bore, feed means engaging the last nail of the series coaxially with said axis, resilient means for advancing said feed means and nails toward said bore, and resilient stop means yieldably engaging the leading nail head at said bore in a direction opposing movement of the nail past said bore.

5. In a nailer having a housing providing a tubular portion forming a cylindrical compartment and a barrel portion having a bore laterally in communication with the compartment, a helical feeder track peripherally supported in the tubular portion and having a T-shaped groove therein for receiving the head portion of nails in a helical path in edge to edge contact with each other with their shanks crossing each other at contacting points intermediate their ends at the center of the compartment in a straight line normal to said bore.

6. In a nailer having a housing providing a tubular portion forming a cylindrical compartment and a barrel portion having a bore and a portal in the wall thereof, magazine guide means including a trackway leading to said portal along a helical path received in said tubular portion and supporting a series of nails with their heads successively contacting each other edge to edge in a helical line which has an acute lead angle with the shanks of the nails crossing each other at contacting points intermediate their ends that are disposed on an axis normal to said bore, follower means engaging the last nail of the series coaxially with said axis, and resilient means for advancing said follower means and nails toward said bore.

7. In a power driven nailing machine, the combination of a housing having a bore therethrough, a cylindrical magazine carried by said housing, a nail portal laterally through the wall of the bore interconnecting said bore and magazine, helical means for supporting a series of nails side by side with their shanks contacting and crossing one another in a straight line and their heads defining a helix ending at said portal, and means engaging the shank of the last nail along said straight line for advancing the nail heads along said helix into said portal with a portion of the endmost nail intruding into said bore.

8. In a nailer having a housing providing a tubular portion forming a cylindrical compartment and a barrel portion having a bore in communication with the compartment, a magazine for feeding a series of nails having shanks crossing each other intermediate their ends at contact points disposed along an axis normal to said bore with their heads defining a helical path having an acute angle as projected radially against said axis, said magazine comprising helical guide means for conducting the heads of the nails helically towards and tangentially to said bore with the leading nail extending partially into said bore, means engaging said series of nails coaxially with said axis, for advancing said nails towards said bore, and resilient stop means yieldably engaging the leading nail to restrain movement of said series of nails along said helical path.

9. A nail magazine for a clip of nails crossing each other and releasably secured by a frangible material at contact points intermediate their ends, said magazine comprising a cylindrical shell, a feedway track defined by two spaced sides providing a radially oriented helical space between the radial inner edges of which define a helix having a lead angle of approximately 45°, said track being open axially through the center thereof and said inner edges defining a cylindrical surface of revolution clearing said frangible material, means integrating the two spaced sides to define said cylindrical surface of revolution, said feed way track being received in said cylindrical shell, and exposing within said inner edges a substantial length of the nail shank at the center of the tubular housing where they are in crossed relationship, and resilient follower means carried by said shell slidable through said center opening in guided relation on the inner edges of said spaced sides and engaging the last nail in the track to urge nails along said feed way.

No references cited.

GRANVILLE Y. CUSTER, JR., *Primary Examiner.*